United States Patent
Asaka et al.

(10) Patent No.: US 6,894,885 B2
(45) Date of Patent: May 17, 2005

(54) READER/WRITER AND ANALOG SWITCHING CIRCUIT

(75) Inventors: Nobuyoshi Asaka, Takatsuki (JP); Keiichi Iiyama, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 563 days.

(21) Appl. No.: 10/051,060

(22) Filed: Jan. 22, 2002

(65) Prior Publication Data

US 2002/0121814 A1 Sep. 5, 2002

(30) Foreign Application Priority Data

Jan. 22, 2001 (JP) ........................................ 2001-012918

(51) Int. Cl.[7] .............................................. H01H 47/00
(52) U.S. Cl. ........................ 361/143; 361/58; 361/113; 307/112
(58) Field of Search .......................... 361/58, 143, 113; 307/112; 340/825.54; 102/427

(56) References Cited

U.S. PATENT DOCUMENTS 6,014,088 A * 1/2000 Van Santbrink et al. ... 340/10.3

* cited by examiner

Primary Examiner—Stephen W. Jackson
(74) Attorney, Agent, or Firm—McDermott Will & Emery LLP

(57) ABSTRACT

The reader/writer of this invention includes a high voltage withstanding amplifier, plural resonance circuits and plural high voltage withstanding analog switching circuits. The high voltage withstanding amplifier amplifies an analog signal to be sent to the outside. Each of the resonance circuits sends the analog signal amplified by the high voltage withstanding amplifier to the outside. The high voltage withstanding analog switching circuits are provided between the high voltage withstanding amplifier and the resonance circuits correspondingly to the resonance circuits. Each of the high voltage withstanding analog switching circuits electrically connects/disconnects the high voltage withstanding amplifier to/from the corresponding resonance circuit. Since the reader/writer includes the high voltage withstanding analog switching circuits, there is no need to provide high voltage withstanding amplifiers at the previous stages of the resonance circuits as in a conventional reader/writer. Accordingly, as compared with the conventional reader/writer in which the high voltage withstanding amplifiers are provided correspondingly to the respective resonance circuits, the number of high voltage withstanding amplifiers (the number of components) can be reduced.

5 Claims, 6 Drawing Sheets

(i=1, 2, 3)

READER/WRITER AND ANALOG SWITCHING CIRCUIT

BACKGROUND OF THE INVENTION

The present invention relates to a reader/writer and an analog switching circuit. More particularly, it relates to a reader/writer for sending/receiving data to/from the outside in a contactless manner through electromagnetic induction coupling and an analog switching circuit for providing conduction/nonconduction of an analog signal.

Recently developed data carriers include IC chips on which memories and control circuits are integrated so as to be supplied with power from the outside and send/receive data to/from the outside in a contactless manner through electromagnetic induction coupling or the like. An example of such data carriers is a contactless IC tag. A contactless IC tag is characterized by a large storage capacity and high security function. Also, since a contactless IC tag can communicate by bringing the tag itself close to the antenna portion of a reader/writer or inserting the tag into the slot of a reader/writer, there is no need to provide a mechanism unit such as contact, and hence, it can be maintenance-free. Accordingly, a contactless IC tag can be useful for product management and production control and also for component management and characteristic improvement by setting it on a removable component used in equipment. For example, there is a contactless IC tag system in which contactless IC tags are respectively set on a variety of goods so as to store ID numbers and characteristics of the goods in memories included in the contactless IC tags for communicating with a reader/writer in a contactless manner through the electromagnetic induction method.

In the contactless IC tag system, the communication with a plurality of contactless IC tags is performed by any of the following methods:

(a) The plural contactless IC tags are respectively and successively moved close to the antenna circuit part of a reader/writer;

(b) The antenna circuit part of a reader/writer is successively moved close to the respective IC tags;

(c) A plurality of readers/writers are prepared so as to communicate with corresponding contactless IC tags; and (d) Switches are provided between a transmission circuit and a plurality of antenna circuits of a reader/writer so as to switch the antenna circuits in the communication with the respective IC tags.

In the contactless IC tag system using the method (d), as shown in FIG. 9, a plurality of (herein three) antenna circuits 108 through 110 are provided with respect to a transmission circuit 101 of a reader/writer 100. Between the transmission circuit 101 and the antenna circuits 108 through 110, small signal switches 102 through 104 and high voltage withstanding amplifiers 105 through 107 are respectively disposed. Herein, each of the small signal switches 102 through 104 is a switch for providing conduction/nonconduction of an analog signal at a comparatively low level (for example, an analog signal having amplitude of ±1 V with 2.5 V at the center). An analog signal from the transmission circuit 101 is sent by any of the small signal switches 102 through 104 (for example, the small signal switch 102) to a corresponding one of the high voltage withstanding amplifiers 105 through 107 (for example, the high voltage withstanding amplifier 105) and is amplified by any of the high voltage withstanding amplifiers 105 through 107 so as to be supplied to a corresponding one of the antenna circuits 108 through 110 (for example, the antenna circuit 108).

In the reader/writer 100 of the contactless IC tag system shown in FIG. 9, the high voltage withstanding amplifiers 105 through 107 are respectively disposed at the previous stages of the antenna circuits 108 through 110, which disadvantageously increases the number of components.

SUMMARY OF THE INVENTION

An object of the invention is providing a reader/writer in which the number of components can be reduced.

According to an aspect of the present invention, a reader/writer sends/receives a signal to/from the outside in a contactless manner through electromagnetic induction coupling and the reader/writer includes a high voltage withstanding amplifier, a plurality of resonance circuits and a plurality of high voltage withstanding analog switching circuits. The high voltage withstanding amplifier amplifies an analog signal to be sent to the outside. The plurality of resonance circuits send the analog signal amplified by the high voltage withstanding amplifier to the outside. The plurality of high voltage withstanding analog switching circuits are provided correspondingly to the plurality of resonance circuits between the high voltage withstanding amplifier and the plurality of resonance circuits. Each of the high voltage withstanding analog switching circuits electrically connects/disconnects the high voltage withstanding amplifier to/from a corresponding one of the plurality of resonance circuits.

Since the plurality of high voltage withstanding analog switching circuits are provided in the reader/writer, there is no need to provide high voltage withstanding amplifiers respectively at the previous stages of the resonance circuits as in the conventional reader/writer but merely one high voltage withstanding amplifier is provided at the previous stage of the plurality of high voltage withstanding analog switching circuits. Accordingly, as compared with the conventional reader/writer in which the high voltage withstanding amplifiers are provided correspondingly to the resonance circuits, the number of high voltage withstanding amplifiers (the number of components) can be reduced. As a result, the cost can be lowered.

Preferably, each of the plurality of high voltage withstanding analog switching circuits includes a high voltage withstanding FET, a first resistor, a second resistor, a diode and a switch. The high voltage withstanding FET is a P-channel FET and is connected between a corresponding one of the plurality of resonance circuits and the high voltage withstanding amplifier. The first resistor is connected between a power supply node for receiving a positive voltage at a given level and a gate of the high voltage withstanding FET. The second resistor is connected between the gate of the high voltage withstanding FET and a ground node for receiving a ground voltage and has a resistance value smaller than a resistance value of the first resistor. The diode is connected between the second resistor and the ground node to be forward in a direction from the second resistor to the ground node. The switch is serially connected to the second resistor and the diode between the gate of the high voltage withstanding FET and the ground node for electrically connecting/disconnecting the gate of the high voltage withstanding FET to/from the ground node.

Preferably, the high voltage withstanding FET is a junction FET. Also, the positive voltage is higher than a positive maximum value of an input signal to the high voltage withstanding FET.

According to another aspect of the present invention, an analog switching circuit includes a high voltage withstanding FET, a first resistor, a second resistor, a diode and a switch. The high voltage withstanding FET is a P-channel FET. The first resistor is connected between a power supply node for receiving a positive voltage at a given level and a gate of the high voltage withstanding FET. The second resistor is connected between the gate of the high voltage withstanding FET and a ground node for receiving a ground voltage and has a resistance value smaller than a resistance value of the first resistor. The diode is connected between the second resistor and the ground node to be forward in a direction from the second resistor to the ground node. The switch is serially connected to the second resistor and the diode between the gate of the high voltage withstanding FET and the ground node for electrically connecting/disconnecting the gate of the high voltage withstanding FET to/from the ground node. In this analog switching circuit, a source and a drain of the high voltage withstanding FET correspond to input and output.

Preferably, the high voltage withstanding FET is a junction FET. Also, the positive voltage is higher than a maximum value of an input signal to the high voltage withstanding FET.

In the above analog switching circuit, when the gate of the high voltage withstanding FET and the ground node are electrically connected by the switch (namely, when the switch is ON state), the gate voltage of the high voltage withstanding FET is pulled to be substantially a ground voltage level. This is because the first resistor has a resistance value larger than that of the second resistor. Furthermore, the source voltage of the high voltage withstanding FET (namely, the voltage of an input signal) is transferred to the gate thereof through the floating capacitance thereof. When the source voltage (namely, the voltage of the input signal) is positive, the diode is turned on. However, the gate voltage is kept at substantially the same level as the source voltage (namely, the voltage of the input signal) by the second resistor. When the source voltage (namely, the voltage of the input signal) is negative, the diode is turned off. Accordingly, the gate voltage is kept at substantially the same level as this negative voltage. Thus, the gate voltage of the high voltage withstanding FET is kept at substantially the same level as the source voltage (namely, the voltage of the input signal) no matter whether the source voltage (namely, the voltage of the input signal) is positive or negative. Accordingly, the potential difference between the gate and the source is substantially zero, and hence, the high voltage withstanding FET is turned on. In other words, the source and the drain are electrically connected, so that an analog signal inputted to the source can be outputted from the drain.

On the other hand, when the gate of the high voltage withstanding FET and the ground node are electrically disconnected by the switch (namely, when the switch is OFF state), no current flows through the first resistor, and hence, the gate voltage of the high voltage withstanding FET is pulled up to the given level of the positive voltage. Thus, the gate voltage of the high voltage withstanding FET is always higher than the source voltage by a voltage corresponding to the positive voltage at the given level. This positive voltage is higher than the positive maximum value of an input signal to the high voltage withstanding FET. Accordingly, the high voltage withstanding FET is turned off. As a result, the source and the drain are not electrically connected, so that an analog signal inputted to the source cannot be outputted from the drain.

As described above, when the switch is ON states the gate voltage of the high voltage withstanding FET is kept at substantially the same level as the source voltage, and therefore, a negative power supply voltage is not necessary. When the switch is OFF state, the gate voltage of the high voltage withstanding FET is pulled up to the given level of the positive voltage, and therefore, a negative power supply voltage is not necessary. Accordingly, there is no need to generate a negative voltage for operating the analog switching circuit. As a result, as compared with a conventional analog switching circuit that needs a positive voltage and a negative voltage, the number of components of a circuit for generating a power supply voltage for operating the analog switching circuit can be reduced.

DESCRIPTION OF THE PREFERRED EMBODIMENTS

Figure 1:
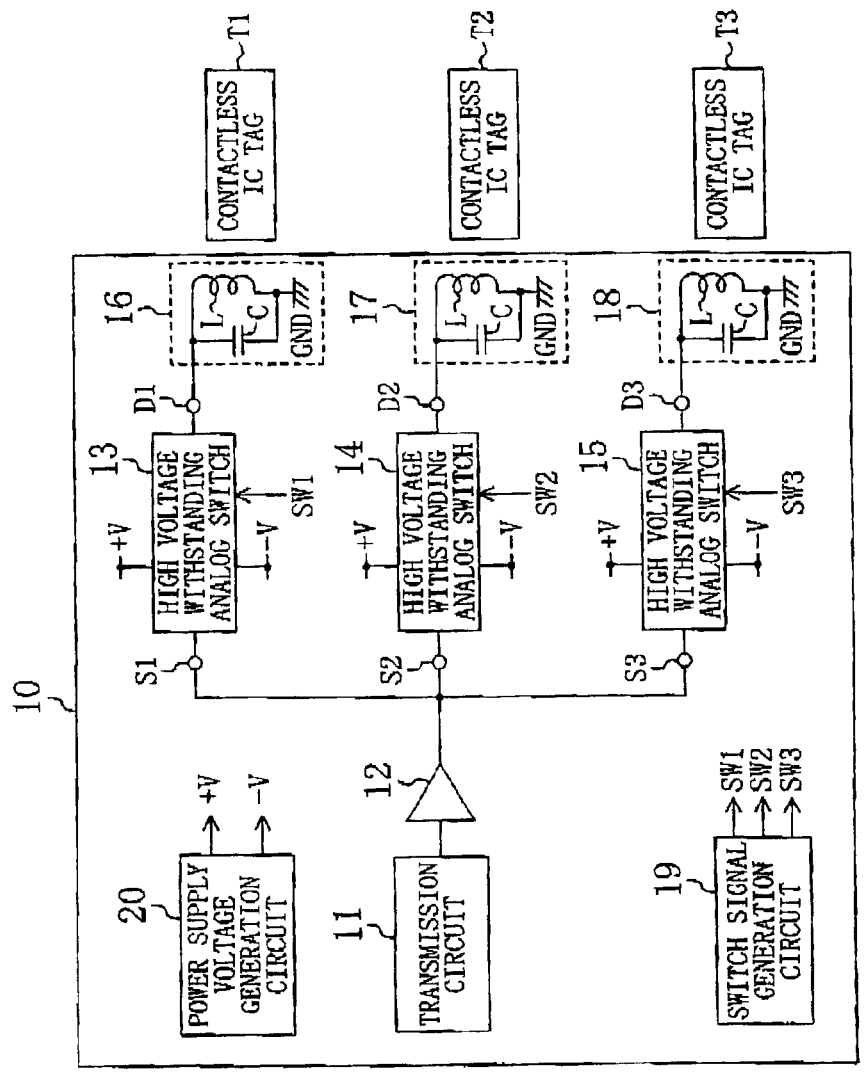
FIG. 1 is a block diagram for showing the structure of a contactless IC tag system according to Embodiment 1 of the present invention.

Preferred embodiments of the present invention will now be described in detail with reference to the accompanying drawings. In the drawings referred to below, like reference numerals are used to refer to like or corresponding elements so as to avoid repeating the description.

Embodiment 1

<Structure of Contactless IC Tag System>

FIG. 1 is a block diagram for showing the structure of a contactless IC tag system according to Embodiment 1 of the present invention. Referring to FIG. 1, the contactless IC tag system includes a reader/writer 10 and contactless IC tags T1 through T3.

The reader/writer 10 includes a transmission circuit 11, a high voltage withstanding amplifier 12, high voltage withstanding analog switching circuits 13 through is, antenna circuits 16 through 18, a switch signal generation circuit 19 and a power supply voltage generation circuit 20. The power supply voltage generation circuit 20 generates a positive power supply voltage (+V) and a negative power supply voltage (−V). The transmission circuit 11 outputs an analog signal to be sent to the outside. The high voltage withstanding amplifier 12 amplifies the analog signal from the transmission circuit 11 and outputs the amplified analog signal to nodes S1 through S3. The high voltage withstanding analog switching circuits 13 through 15 are respectively connected between the nodes S1 through S3 and nodes D1 through D3 and receive the positive power supply voltage (+V) and the negative power supply voltage (−V) from the power supply voltage generation circuit 20. Also, the high voltage withstanding analog switching circuits 13 through 15 respectively electrically connect the nodes S1 through S3 to the node D1 through D3 in response to active switch signals SW1 through SW3, and respectively electrically disconnect the nodes S1 through S3 from the nodes D1 through D3 in response to inactive switch signals SW1 through SW3. Each of the antenna circuits 16 through 18 includes a coil L and a capacitor C. The coil L and the capacitor C are connected in parallel between a corresponding one of the nodes D1 through D3 and a ground node GND supplied with a ground voltage. In other words, the coil L and the capacitor C together form a resonance circuit. The resonance circuit composed of the coil L and the capacitor C sends radio waves according to a signal from the corresponding one of the nodes D1 through D3 to the outside. The switch signal generation circuit 19 generates the active or inactive switch signals SW1 through SW3.

Each of contactless IC tags T1 through T3 sends/receives information to/from the reader/writer 10 in a contactless manner by using a medium such as radio waves. Each of the contactless IC tags T1 through T3 includes an IC chip (not show) on which necessary circuits such as memories and control circuits are integrated. The contactless IC tags T1 through T3 are respectively set on a variety of goods, so that the memories included therein can store the ID numbers and the characteristics of the goods. The power necessary for the operation of the IC chips included in the contactless IC tags T1 through T3 is obtained by rectifying an induction current obtained by receiving radio waves sent from the reader/writer 10 with the electromagnetic induction function of coils (not shown) included in the contactless IC tags T1 through T3.

<Example 1 of High Voltage Withstanding Analog Switching Circuit>

Figure 2:
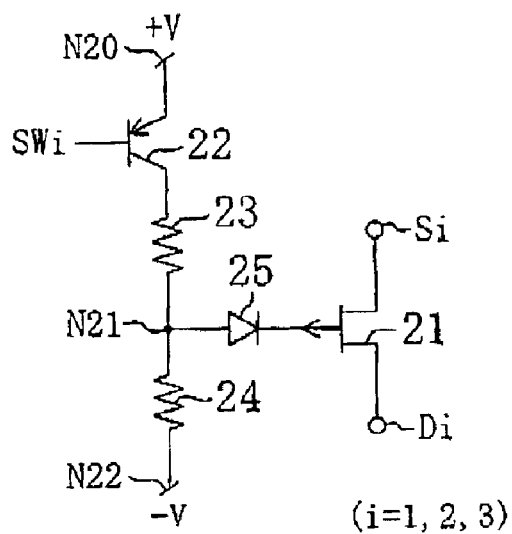
FIG. 2 is a circuit diagram for showing an example of the specific configuration of a high voltage withstanding analog switching circuit of FIG. 1.

FIG. 2 is a diagram for showing an example of the specific configuration of each of the high voltage withstanding analog switching circuits 13 through 15 of FIG. 1. Referring to FIG. 2, the analog switching circuit includes a high voltage withstanding junction FET (field effect transistor) 21, a PNP transistor 22, resistors 23 and 24 and a diode 25. The high voltage withstanding junction FET 21 is a p-channel FET and is connected between a node Si and a node Di. The PNP transistor 22 is connected between a power supply node N20 and the resistor 23. The power supply node N20 receives the positive power supply voltage (+V). The positive power supply voltage (+V) is higher than the positive maximum value of an analog signal inputted to the node Si. The base of the PNP transistor 22 is supplied with a switch signal SWi. The resistor 23 is connected between the collector of the PNP transistor 22 and a node N21. The resistor 24 is connected between the node N21 and a node N22. The node N22 receives the negative power supply voltage (−V). The negative power supply voltage (−V) is lower than the negative minimum value of the analog signal inputted to the node Si. The diode 25 is connected between the node N21 and the gate of the high voltage withstanding junction FET 21 so as to be forward in a direction from the node N21 to the gate of the high voltage withstanding junction FET 21.

Now, the operation of the high voltage withstanding analog switching circuit having the aforementioned configuration will be described.

When an active switch signal SWi is supplied to the base of the PNP transistor 22, the PNP transistor 22 is turned on (enters a saturation state). In response to this, the diode 25 is turned on. This is because the positive power supply voltage (+V) is higher than the positive maximum value of an analog signal inputted to the node Si. Accordingly, the gate voltage of the high voltage withstanding junction FET 21 is pulled to the positive power supply voltage (+V), so as to turn off the high voltage withstanding junction FET 21. As a result, the analog signal inputted to the node Si is not outputted to the node Di.

Figure 3:
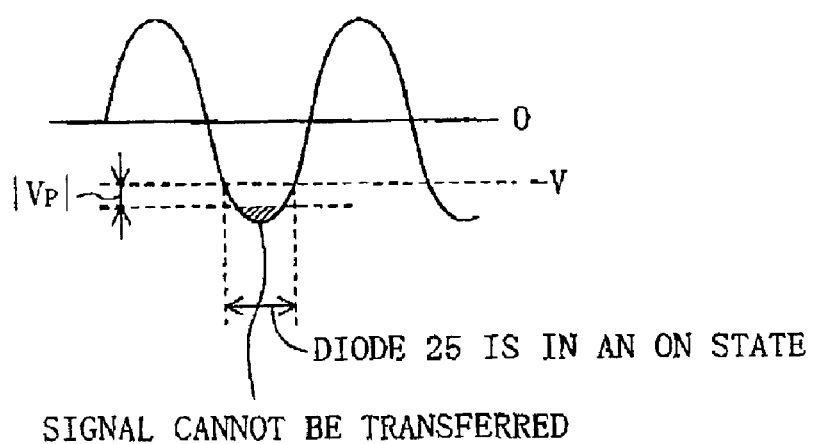
FIG. 3 shows a current-voltage characteristic of a high voltage withstanding junction FET of FIG. 2.

On the other hand, when an inactive switch signal SWi is supplied to the base of the PNP transistor 22, the PNP transistor 22 is turned off (enters a cutoff state). In response to this, the diode 25 is turned off. This is because the negative power supply voltage (−V) is lower than the negative minimum value of an analog signal inputted to the node Si. Accordingly, the gate of the high voltage withstanding junction FET 21 is opened, so as to turn on the high voltage withstanding junction FET 21. As a result, the analog signal inputted to the node Si is outputted to the node Di. If the negative power supply voltage (−V) is higher than the negative minimum value of the analog signal inputted to the node Si, the diode 25 is in an on state while the negative power supply voltage is higher than the analog signal, and hence, the gate voltage of the high voltage withstanding junction FET 21 accords with the negative power supply voltage (−V). Accordingly, as shown in FIG. 3, the high voltage withstanding junction FET 21 is turned off with respect to a signal at a voltage level lower than −(V+Vp) among signals inputted to the node Si, and therefore, this signal cannot be transferred. Accordingly, the negative power supply voltage (−V) should be lower than the negative minimum value of an analog signal inputted to the node Si. In other words, in order to attain conduction of an analog signal (AC signal) between the source and the drain of the high voltage withstanding junction FET 21, it is necessary to use the positive power supply voltage (+V) higher than the positive maximum value of the signal and the negative power supply voltage (−V) lower than the negative minimum value of the signal.

<Example 2 of High Voltage Withstanding Analog Switching Circuit>

Figure 4:
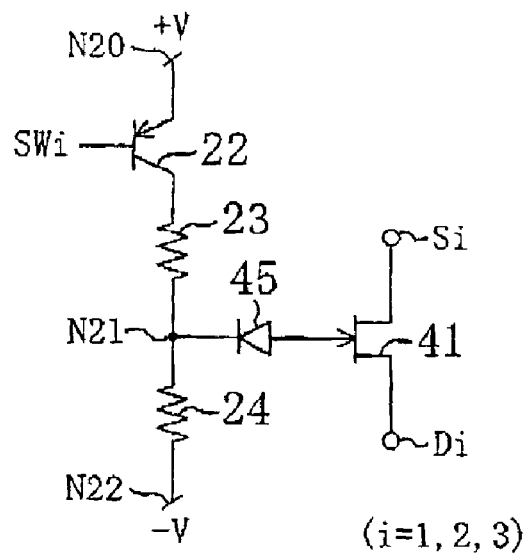
FIG. 4 is a circuit diagram for showing another example of the specific configuration of the high voltage withstanding analog switching circuit of FIG. 1.

FIG. 4 is a diagram for showing another example of the specific configuration of each of the high voltage withstanding analog switching circuits 13 through 15 of FIG. 1. Referring to FIG. 4, the analog switching circuit includes a high voltage withstanding junction FET 41, a PNP transistor 22, resistors 23 and 24 and a diode 45. The high voltage withstanding junction FET 41 is an N-channel FET and is connected between a node Si and a node Di. The diode 45 is connected between the gate of the high voltage withstanding junction FET 41 and a node N21 to be forward in a direction from the gate of the high voltage withstanding junction FET 41 to the node N21.

Now, the operation of the high voltage withstanding analog switching circuit having the aforementioned configuration will be described.

When an active switch signal SWi is supplied to the base of the PNP transistor 22, the PNP transistor 22 is turned on (enters a saturation state). In response to this, the diode 45 is turned off. This is because the positive power supply voltage (+V) is higher than the positive maximum value of an analog signal inputted to the node Si. Accordingly, the gate of the high voltage withstanding junction FET 41 is opened, so as to turn on the high voltage withstanding junction FET 41. As a result, the analog signal inputted to the node Si is outputted to the node Di.

Figure 5:
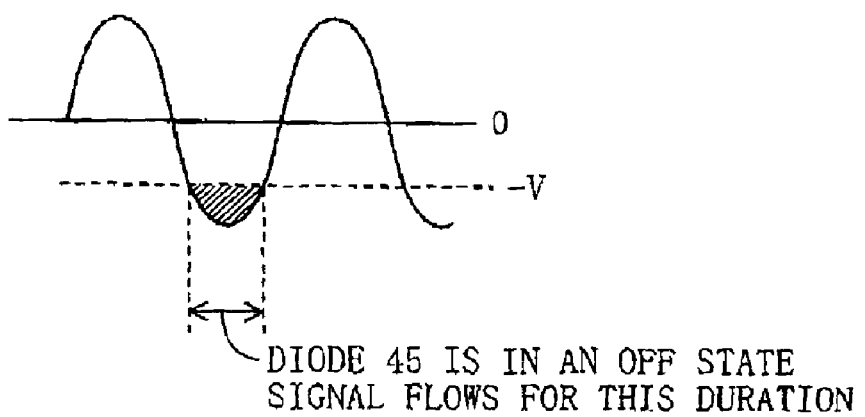
FIG. 5 shows a current-voltage characteristic of a high voltage withstanding junction FET of FIG. 4.

On the other hand, when an inactive switch signal SWi is supplied to the base of the PNP transistor 22, the PNP transistor 22 is turned off (enters a cutoff state). In response to this, the diode 45 is turned on. This is because the negative power supply voltage (−V) is lower than the negative minimum value of an analog signal inputted to the node Si. Accordingly, the gate voltage of the high voltage withstanding junction FET 41 is pulled to the negative power supply voltage (−V), so as to turn off the high voltage withstanding junction FET 41. As a result, the analog signal inputted to the node Si is not outputted to the node Di. If the negative power supply voltage (−V) is higher than the negative minimum value of the analog signal inputted to the node Si, the diode 25 is in an off state while the negative power supply voltage is higher than the analog signal, and hence, the gate of the high voltage withstanding junction FET 41 is opened. Accordingly, as shown in FIG. 5, the high voltage withstanding junction FET 41 is turned on with respect to a signal at a voltage level lower than the negative power supply voltage (−V) among signals inputted to the node Si, and this signal is outputted to the node Di. Accordingly, the negative power supply voltage (−V) should be lower than the negative minimum value of the analog signal inputted to the node Si. In other words, in order to attain conduction of an analog signal (AC signal) between the source and the drain of the high voltage withstanding junction FET 41, it is necessary to use the positive power supply voltage (+V) higher than the positive maximum value of the signal and the negative power supply voltage (−V) lower than the negative minimum value of the signal.

<Operation of Contactless IC Tag System>

The contactless IC tag system of FIG. 1 is operated as follows:

The switch signal generation circuit 19 outputs an active switch signal SW1 and inactive switch signals SW2 and SW3. In response to the active switch signal SW1, the high voltage withstanding analog switching circuit 13 sets an electrical connected (conductive) state between the node S1 and the node D1. On the other hand, in response to the inactive switch signals SW2 and SW3, the high voltage withstanding analog switching circuits 14 and 15 set an electrical disconnected (nonconductive) state between the nodes S2 and S3 and the nodes D2 and D3, respectively. A signal (analog signal) to be sent to the contactless IC tag T1 is outputted from the transmission circuit 11. The signal outputted from the transmission circuit 11 is amplified by the high voltage withstanding amplifier 12, and the amplified signal is outputted to the nodes S1 through S3. The analog signal supplied to the node S1 is outputted to the node D1 by the high voltage withstanding analog switching circuit 13 while the analog signals supplied to the nodes S2 and S3 are not outputted to the nodes D2 and D3, respectively. The analog signal outputted to the node D1 is sent to the contactless IC tag T1 by the antenna circuit 16. In contrast, no communication is established between the antenna circuits 17 and 18 and the contactless IC tags T2 and T3.

When the communication with the contactless IC tag T1 is completed, the switch signal generation circuit 19 outputs an active switch signal SW2 and inactive switch signals SW1 and SW3. In response to the active switch signal SW2, the high voltage withstanding analog switching circuit 14 sets an electrical connected (conductive) state between the node S2 and the node D2. On the other hand, in response to the inactive switch signals SW1 and SW3, the high voltage withstanding analog switching circuits 13 and 15 set an electrical disconnected (nonconductive) state between the nodes S1 and S3 and the nodes D1 and D3, respectively.

Therefore, in the same manner as described above, an analog signal supplied to the node S2 is outputted to the node D2 by the high voltage withstanding analog switching circuit 14 to be sent to the contactless IC tag T2 by the antenna circuit 17.

In this manner, the communication with the plural contactless IC tags T1 through T3 is performed by successively turning on/off the high voltage withstanding analog switching circuits 13 through 15.

<Effect>

Figure 6:
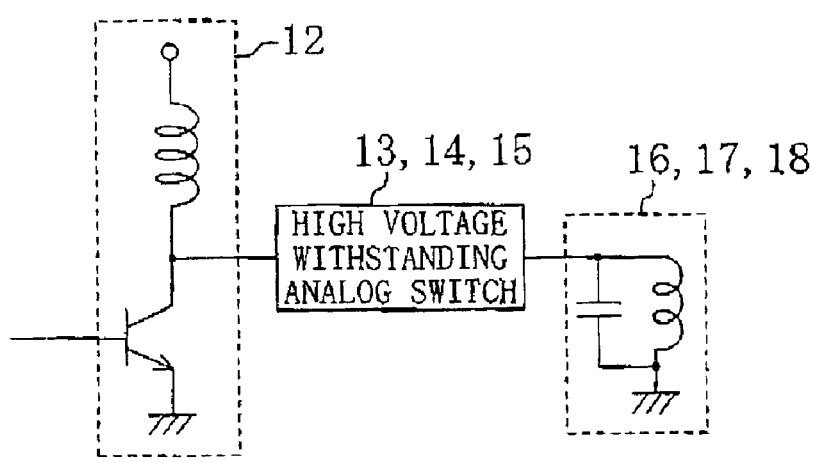
FIG. 6 is a diagram of a high voltage withstanding amplifier, the high voltage withstanding analog switching circuit and an antenna circuit of FIG. 1.
Figure 9:
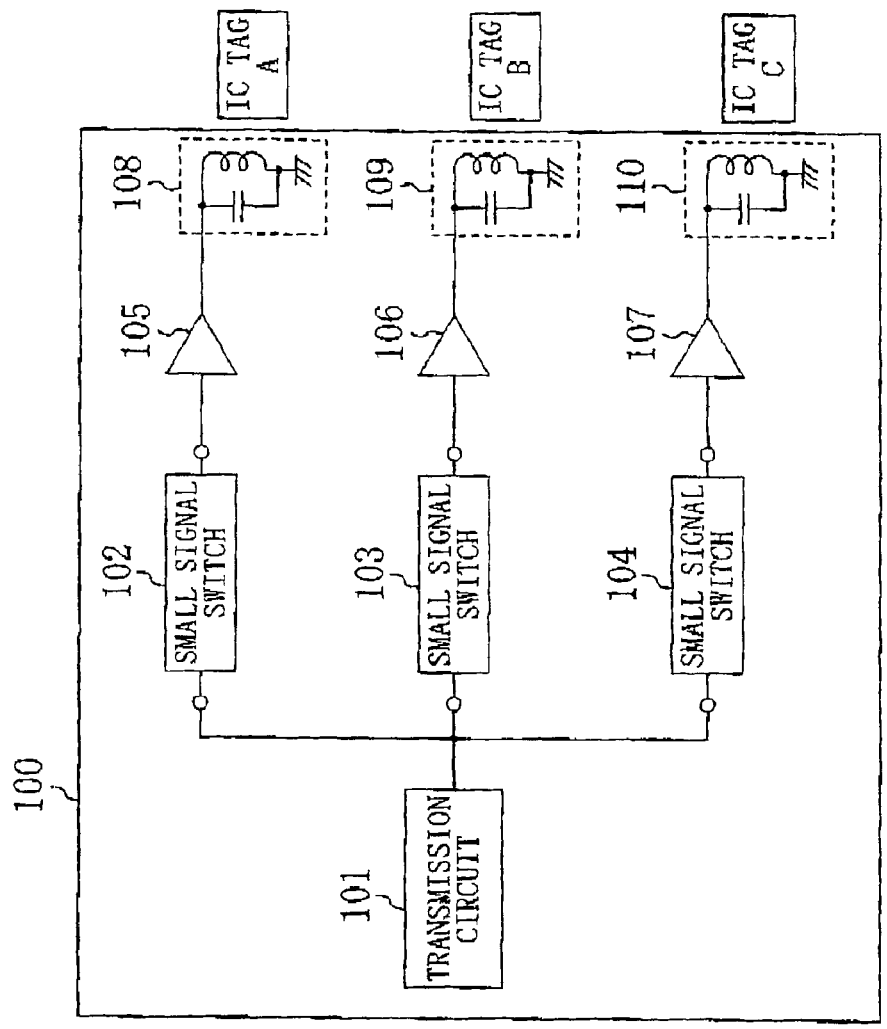
FIG. 9 is a block diagram for showing the structure of a conventional contactless IC tag system.

As shown in FIG. 6, since each of the antenna circuits 16 through 18 is a resonance circuit composed of the coil L and the capacitor C, the impedance is high and the output has large amplitude. For example, an output of 20 Vp-p can be obtained with a power supply voltage of 16 V. In the conventional reader/writer shown in FIG. 9, since the output to the antenna circuits 108 through 110 is switched by using the small signal switches 102 through 104, it is necessary to provide the high voltage withstanding amplifiers 105 through 107 at the previous stages of the antenna circuits 108 through 110, respectively.

In contrast, since the high voltage withstanding analog switching circuits 16 through 18 are provided in the reader/writer 10 shown in FIG. 1, there is no need to provide the high voltage withstanding amplifiers at the previous stages of the antenna circuits 16 through 18, respectively but merely one high voltage withstanding amplifier 12 is provided between the transmission circuit 11 and the high voltage withstanding analog switching circuits 13 through 15. In other words, the number of high voltage withstanding amplifiers (the number of components) can be smaller than in the conventional reader/writer. As a result, the cost can be lowered.

Although a junction FET is used as the high voltage withstanding FET in the analog switching circuits of FIGS. 2 and 4, a MOS FET may be used instead.

Embodiment 2

Figure 7:
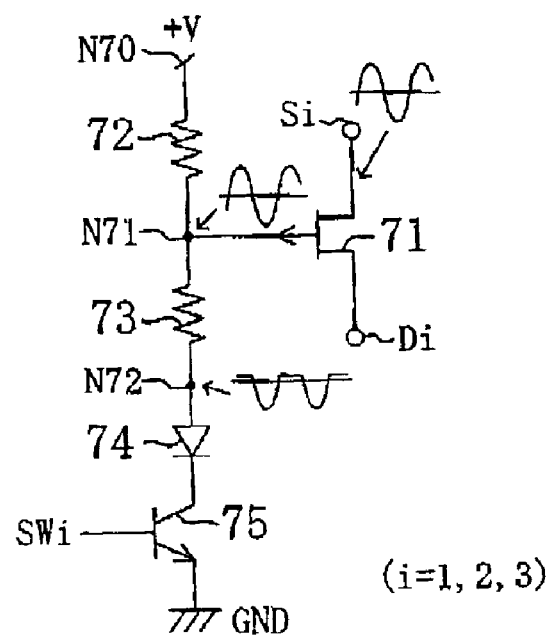
FIG. 7 is a circuit diagram for showing the configuration of a high voltage withstanding analog switching circuit according to Embodiment 2 of the invention.

A contactless IC tag system according to Embodiment 2 of the present invention is characterized by using a high voltage withstanding analog switching circuit shown in FIG. 7 instead of each of the high voltage withstanding analog switching circuits 13 through 15 shown in FIGS. 1, 2 and 4.

<Configuration of High Voltage Withstanding Analog Switching Circuit>

Referring to FIG. 7, the high voltage withstanding analog switching circuit includes a high voltage withstanding junction FET 71, resistors 72 and 73, a diode 74 and an NPN transistor 75. The high voltage withstanding junction FET 71 is a p-channel FET and is connected between a node Si and a node Di. The gate of the high voltage withstanding junction transistor 71 is connected to a node N71. The resistor 72 is connected between a power supply node N70 and the node N71 and has a resistance value larger than that of the resistor 73. The power supply node N70 receives a positive power supply voltage (+V). The positive power supply voltage (+V) is higher than the positive maximum value of an analog signal inputted to the node Si. The resistor 73 is connected between the node N71 and a node N72 and has a resistance value smaller than that of the resistor 72. The diode 74 is connected between the node N72 and the collector of the NPN transistor 75 to be forward in a direction from the node N72 to the collector of the NPN transistor 75. The NPN transistor 75 is connected between the diode 74 and a ground node GND. The ground node GND receives a ground voltage. The base of the NPN transistor 75 is supplied with a switch signal SWi (wherein i is 1 through 3).

<Operation of High Voltage Withstanding Analog Switching Circuit>

Figure 8:
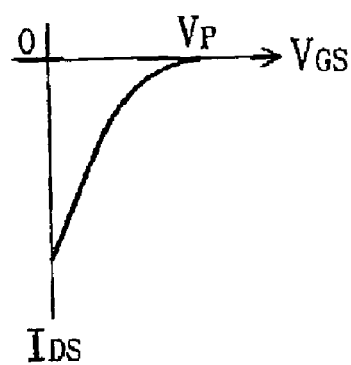
FIG. 8 shows a voltage-current characteristic of a high voltage withstanding junction FET of FIG. 7.

Now, the operation of the high voltage withstanding analog switching circuit having the aforementioned configuration will be described. FIG. 8 is a diagram for showing a characteristic obtained between a gate-source voltage VGS and a drain-source current IDS of the high voltage withstanding junction FET 71 of FIG. 7. When an active switch signal SWi is supplied to the base of the NPN transistor 75, the NPN transistor 75 is turned on (enters a saturation state), and hence, the gate voltage of the high voltage withstanding junction FET 71 (namely, the voltage at the node N71) is pulled to be substantially a ground voltage level. This is because the resistor 72 has a resistance value larger than that of the resistor 73, namely, because there is a relationship of (the resistance value of the resistor 72)>>(the resistance value of the resistor 73). Furthermore, the source voltage of the high voltage withstanding junction FET 71, namely, the voltage of a signal inputted to the node Si, is transferred to the gate thereof through the floating capacitance thereof. When the source voltage is positive, the diode 74 is turned on. However, the gate voltage (namely, the voltage at the node N71) is kept at substantially the same level as the source voltage by the resistor 73. When the source voltage is negative, the diode 74 is turned off. Accordingly, the gate voltage (namely, the voltage at the node N71) is kept at substantially the same level as this negative voltage. In this manner, the gate voltage of the high voltage withstanding junction FET 71 is kept at substantially the sate level as the source voltage no matter whether the source voltage (namely, the voltage of a signal inputted to the node Si) is positive or negative. As a result, the potential difference between the gate and the source is substantially zero, and hence, the high voltage withstanding junction FET 71 is turned on. In other words, the source and the drain of the high voltage withstanding junction FET 71 is electrically connected, so that an analog signal inputted to the node Si can be outputted from the node Di.

On the other hand, when an inactive switch signal SWi is supplied to the base of the NPN transistor 75, the NPN transistor 75 is turned off (enters a cutoff state). When the NPN transistor 75 is in an off state, no current flows through the resistor 72, and hence, the gate voltage of the high voltage withstanding junction FET 71 (namely, the voltage at the node N71) is pulled up to the positive power supply voltage (+V). Therefore, the gate voltage of the high voltage withstanding junction FET 71 is always higher than the source voltage by a voltage corresponding to the positive power supply voltage (+V). The positive power supply voltage (+V) is higher than the positive maximum value of an analog signal inputted to the node Si. Accordingly, the high voltage withstanding junction FET 71 is turned off. As a result, the source and the drain of the high voltage withstanding junction FET 71 are not electrically connected, so that an analog signal inputted to the node Si cannot be outputted from the node Di.

<Effect>

In this manner, in the high voltage withstanding analog switching circuit of Embodiment 2, the gate voltage of the high voltage withstanding junction FET 71 is kept at substantially the same level as the source voltage no matter whether the source voltage (namely, the voltage of a signal inputted to the node Si) is positive or negative, and therefore, a negative power supply voltage (−V) is not necessary. Therefore, the power supply voltage generation circuit 20 generates the positive power supply voltage (+V) alone and need not generate a negative power supply voltage (−V). In general, a smaller number of components are necessary for a power supply which generates a single power supply voltage than for a power supply which generates two (positive and negative) power supply voltages. Therefore, as compared with an analog switching circuit in which a positive power supply voltage (+V) and a negative power supply voltage (−V) are necessary as in Embodiment 1, the number of components of the power supply voltage generation circuit 20 can be reduced. As a result, the cost can be lowered.

Although a junction FET is used as the high voltage withstanding FET in the analog switching circuit of FIG. 7, a MOS FET may be used instead.

What is claimed is:

1. A reader/writer for sending/receiving a signal to/from the outside in a contactless manner through electromagnetic induction coupling, comprising:

a high voltage withstanding amplifier for amplifying an analog signal to be sent to the outside;

a plurality of resonance circuits for sending said analog signal amplified by said high voltage withstanding amplifier to the outside; and a plurality of high voltage withstanding analog switching circuits provided correspondingly to said plurality of resonance circuits between an output of said high voltage withstanding amplifier and said plurality of resonance circuits, each for electrically connecting/disconnecting said high voltage withstanding amplifier to/from a corresponding one of said plurality of resonance circuits.

2. The reader/writer of claim 1, wherein each of said plurality of high voltage withstanding analog switching circuits includes:

a high voltage withstanding P-channel FET connected between a corresponding one of said plurality of resonance circuits and said high voltage withstanding amplifier;

a first resistor connected between a power supply node for receiving a positive voltage at a given level and a gate of said FET;

a second resistor connected between the gate of said FET and a ground node for receiving a ground voltage and having a resistance value smaller than a resistance value of said first resistor;

a diode connected between said second resistor and said ground node to be forward in a direction from said second resistor to said ground node; and a switch serially connected to said second resistor and said diode between the gate of said FET and said ground node for electrically connecting/disconnecting the gate of said FET to/from said ground node.

3. The reader/writer of claim 2, wherein said FET is a junction FET, and said positive voltage is higher than a positive maximum value of an input signal to said FET.

4. The reader/writer of claim 1, wherein each of said plurality of high voltage withstanding analog switching circuits includes:

a high voltage withstanding P-channel FET connecting between a corresponding one of said plurality of resonance circuits and said high voltage withstanding amplifier;

a switch connecting/disconnecting a positive power supply node and a fist node;

a first resistor connected between said first node and a second node;

a second resistor connected between said second node and a negative power supply node; and a diode connected between said second node and a gate of said high voltage withstanding P-channel FET to be forward in a direction from said second node to said gate of said high voltage withstanding P-channel FET.

5. The reader/writer of claim 1, wherein each of said plurality of high voltage withstanding analog switching circuits includes:

a high voltage withstanding P-channel FET connecting between a corresponding one of said plurality of resonance circuits and said high voltage withstanding amplifier;

a switch connecting/disconnecting a positive power supply node and a fist node;

a first resistor connected between said first node and a second node;

a second resistor connected between said second node and a negative power supply node; and a diode connected between said second node and a gate of said high voltage withstanding P-channel FET to be reverse in a direction from said second node to said gate of said high voltage withstanding P-channel FET.

* * * * *